(12) United States Patent
Reuvers

(10) Patent No.: US 12,072,245 B2
(45) Date of Patent: Aug. 27, 2024

(54) HEAT FLUX TEMPERATURE SENSOR PROBE FOR NON-INVASIVE PROCESS FLUID TEMPERATURE APPLICATIONS

(71) Applicant: Rosemount Inc., Shakopee, MN (US)

(72) Inventor: John L. Reuvers, Minneapolis, MN (US)

(73) Assignee: Rosemount Inc., Shakopee, MN (US)

( * ) Notice: Subject to any disclaimer, the term of this patent is extended or adjusted under 35 U.S.C. 154(b) by 179 days.

(21) Appl. No.: 17/490,467

(22) Filed: Sep. 30, 2021

(65) Prior Publication Data

US 2023/0101179 A1    Mar. 30, 2023

(51) Int. Cl.
*G01K 17/00*     (2006.01)
*G01K 1/02*      (2021.01)
(Continued)

(52) U.S. Cl.
CPC ............. *G01K 17/00* (2013.01); *G01K 1/026* (2013.01); *G01K 1/08* (2013.01); *G01K 7/02* (2013.01)

(58) Field of Classification Search
CPC .......... G01K 17/00; G01K 1/026; G01K 1/08; G01K 7/02
See application file for complete search history.

(56) References Cited

U.S. PATENT DOCUMENTS 4,018,624 A    4/1977  Rizzolo
6,102,565 A    8/2000  Kita et al.
(Continued)

FOREIGN PATENT DOCUMENTS

EP    3751246 A4      12/2020
GB    2183909 A  *    6/1987    ............. G01K 1/026
(Continued)

OTHER PUBLICATIONS

"Dual OMEGACLAD Thermocouple Wire", Data Sheet retrieved from <<https://assets.omega.com/pdf/cable-and-wire/thermocouple-and-rtd-wire-and-cable/304_INC_DUAL_CLAD.pdf>>, retrieved on Dec. 8, 2021, 1 page.
(Continued)

*Primary Examiner* — Mirellys Jagan
(74) *Attorney, Agent, or Firm* — Christopher R Christenson; Kelly, Holt & Christenson, P.L.L.C.

(57) ABSTRACT

A heat flux temperature sensor probe includes a first mineral-insulated cable portion and a second mineral-insulated cable portion. The first mineral-insulated cable portion has a first metallic sheath, a first plurality of thermocouple conductors extending therein, and an inorganic insulative material insulating the first plurality of thermocouple conductors from one another and from the first metallic sheath. The second mineral-insulated cable portion has a second metallic sheath, a second plurality of thermocouple conductors extending therein, and an inorganic insulative material insulating the second plurality of thermocouple conductors from one another and from the second metallic sheath. A first thermocouple is formed between at least one of the first plurality of thermocouple conductors and one of the second plurality of thermocouple conductors proximate a first end of the second mineral-insulated cable portion. A second thermocouple is formed between at least two of the second plurality of thermocouple conductors proximate a second end of the second mineral-insulated cable. A sheath is operably coupled to and connects the first and second mineral insulated cable portions, a portion of an interior of the sheath is filled with a non-conductive material.

14 Claims, 8 Drawing Sheets

(51) Int. Cl.
    *G01K 1/08*     (2021.01)
    *G01K 7/02*     (2021.01)

(56) References Cited

U.S. PATENT DOCUMENTS

| | | |
|---|---|---|
| 10,620,056 B2 | 4/2020 | Thies et al. |
| 10,976,204 B2 | 4/2021 | Rud |
| 11,073,429 B2 | 7/2021 | Rud |
| 2005/0259719 A1* | 11/2005 | Phillips .................... G01K 7/04 |
| | | 374/208 |
| 2015/0090040 A1 | 4/2015 | Schumacher et al. |
| 2016/0165665 A1* | 6/2016 | Noritake ................ H01R 43/20 |
| | | 219/548 |
| 2021/0396560 A1 | 12/2021 | Strei et al. |
| 2023/0096651 A1 | 3/2023 | Reuvers |

FOREIGN PATENT DOCUMENTS

| | | | | |
|---|---|---|---|---|
| WO | WO-9617230 A1 * | 6/1996 | ............. | G01K 1/026 |
| WO | WO-02088650 A2 * | 11/2002 | ............. | G01K 1/026 |
| WO | WO-2019042529 A1 * | 3/2019 | | |

OTHER PUBLICATIONS

International Search Report and Written Opinion for PCT Application No. PCT/US2022/044343, dated Jan. 18, 2023, 11 pages.

\* cited by examiner

HEAT FLUX TEMPERATURE SENSOR PROBE FOR NON-INVASIVE PROCESS FLUID TEMPERATURE APPLICATIONS

BACKGROUND

Many industrial processes convey process fluids through pipes or other conduits. Such process fluids can include liquids, gasses, and sometimes entrained solids. These process fluid flows may be found in any of a variety of industries including, without limitation, hygienic food and beverage production, water treatment, high-purity pharmaceutical manufacturing, chemical processing, the hydrocarbon fuel industry, including hydrocarbon extraction and processing as well as hydraulic fracturing techniques utilizing erosive and corrosive slurries.

It is common to place a temperature sensor within a thermowell, which is then inserted into the process fluid flow through an aperture in the conduit. However, this approach may not always be practical in that the process fluid may have a very high temperature, be very corrosive, or both. Additionally, thermowells generally require a threaded port or other robust mechanical mount/seal in the conduit and thus, must be designed into the process fluid flow system at a defined location. Accordingly, thermowells, while useful for providing accurate process fluid temperatures, have a number of limitations.

More recently, process fluid temperature has been estimated by measuring an external temperature of a process fluid conduit, such as a pipe, and employing a heat flow calculation. This external approach is considered non-invasive because it does not require any aperture or port to be defined in the conduit. Accordingly, such non-intrusive approaches can be deployed at virtually any location along the conduit.

SUMMARY

A heat flux temperature sensor probe includes a first mineral-insulated cable portion and a second mineral-insulated cable portion. The first mineral-insulated cable portion has a first metallic sheath, a first plurality of thermocouple conductors extending therein, and an inorganic insulative material insulating the first plurality of thermocouple conductors from one another and from the first metallic sheath. The second mineral-insulated cable portion has a second metallic sheath, a second plurality of thermocouple conductors extending therein, and an inorganic insulative material insulating the second plurality of thermocouple conductors from one another and from the second metallic sheath. A first thermocouple is formed between at least one of the first plurality of thermocouple conductors and one of the second plurality of thermocouple conductors proximate a first end of the second mineral-insulated cable portion. A second thermocouple is formed between at least two of the second plurality of thermocouple conductors proximate a second end of the second mineral-insulated cable. A sheath is operably couped to and connects the first and second mineral insulated cable portions, a portion of an interior of the sheath is filled with a non-conductive material.

DETAILED DESCRIPTION OF ILLUSTRATIVE EMBODIMENTS

There are a number of applications where heat flow measurements provide a better way to measure process temperature. For example, Rosemount X-Well™ technology, available from Emerson Automation Solutions can be used to measure process temperature in a non-intrusive or non-invasive manner. This technology uses a pipe surface (skin) temperature measurement, a reference temperature measurement from a position spaced from the pipe surface, and a known thermal relationship (e.g. length and thermal conductivity) between the temperature sensor positions, and a heat flow calculation to infer an internal surface temperature of a process fluid conduit and thus infer a temperature of process fluid within the conduit. A heat flux sensor can provide the skin temperature sensor as well as the reference temperature sensor, however, element placement is important to ensure adequate performance and to provide proper understanding of the heat flow.

Figure 1:
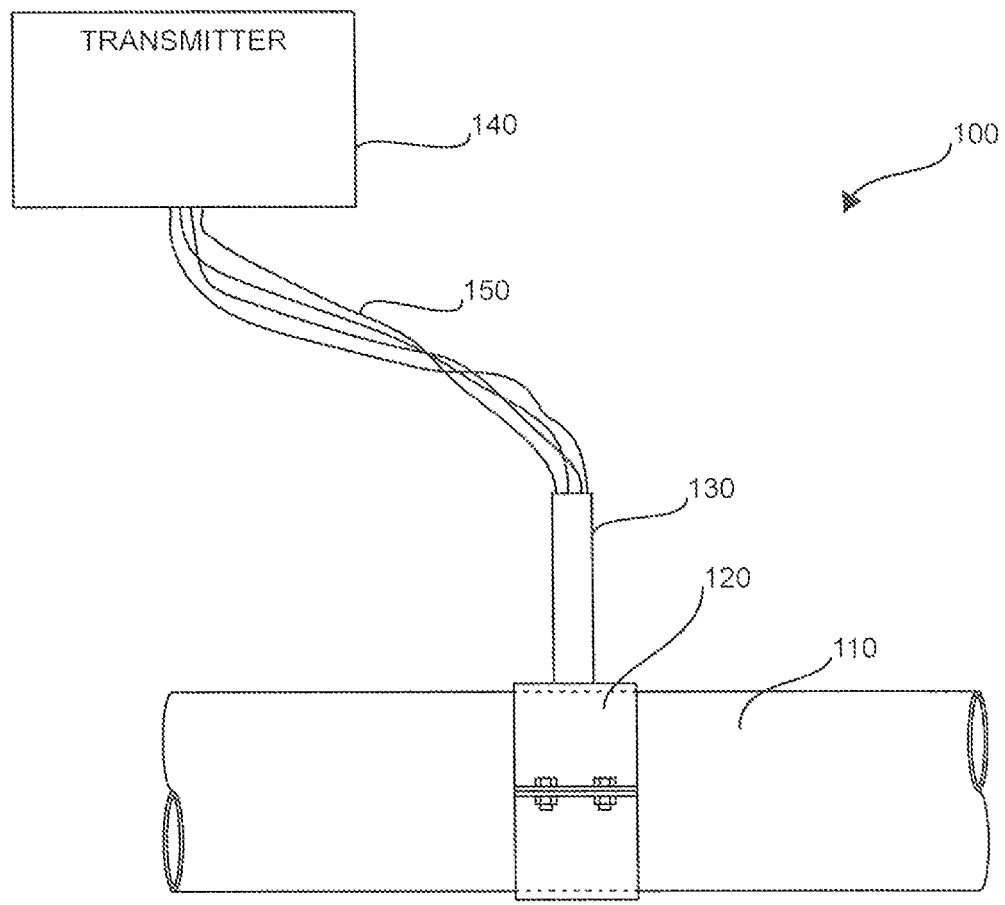
FIG. 1 is a diagrammatic view of a temperature measurement assembly with which embodiments of the present invention are particularly useful.

FIG. 1 is a diagrammatic view of a temperature measurement assembly with which embodiments described herein are particularly useful. Assembly 100 includes a sensor assembly 130 coupled to a process vessel wall 110. The coupling can be a pipe clamp 120, as illustrated in FIG. 1. Sensor assembly 130 has a plurality of leads 150 extending to a transmitter 140, which may be connected locally to, or remotely from, sensor assembly 130. Transmitter 140 includes a controller that is configured to perform the heat flux calculation.

Figure 2:
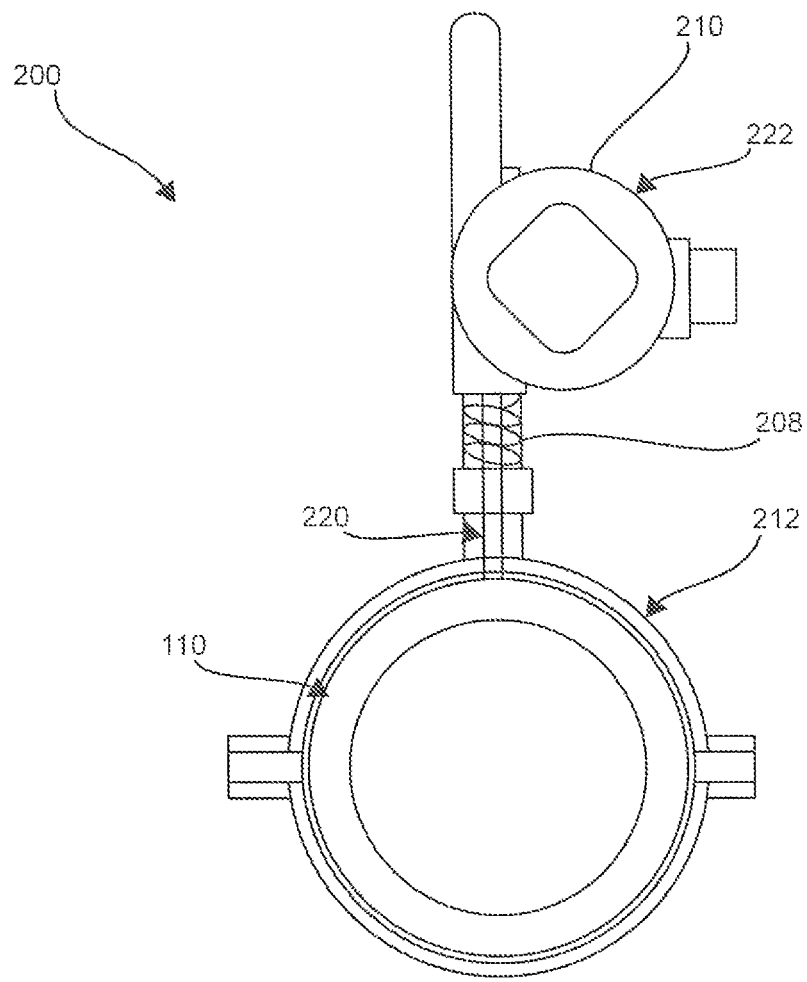
FIG. 2 is a diagrammatic view of a pipe skin measurement assembly with which embodiments of the present invention are particularly useful.

FIG. 2 is a diagrammatic view of a pipe skin measurement assembly with which embodiments of the present invention are particularly useful. System 200 includes a pipe 110, coupled to heat flux temperature probe 220 through the use of a pipe clamp 212. Heat flux temperature probe 220 is directly coupled to a transmitter 222. Transmitter 222 may be configured to calculate a heat flow based on received signals from heat flux temperature probe 220. Heat flux temperature probe 220 is urged against the external diameter of pipe 110 by spring 208. While spring 208 is illustrated, those skilled in the art will appreciate that various techniques can be used to urge heat flux temperature probe 220 into continuous contact with pipe 110. Heat flux temperature probe 220 includes a plurality of temperature sensitive elements, such as thermocouples. These thermocouples are electrically connected to transmitter circuitry within housing 210, which circuitry is configured to obtain temperature measurements from heat flux temperature probe 220 and calculate an estimate of the process fluid temperature based thereon.

In one example, the basic heat flow calculation can be simplified into:

$$T_{corrected} = T_{skin} + (T_{skin} - T_{reference}) * (R_{pipe}/R_{sensor}).$$

In this equation, $T_{skin}$ is the measured temperature of the external surface of the conduit. Additionally, $T_{reference}$ is a second temperature obtained relative to a location having a fixed thermal impedance ($R_{sensor}$) from the temperature sensor that measures $T_{skin}$. $R_{pipe}$ is the thermal impedance of the conduit and can be obtained manually by obtaining pipe material information, pipe wall thickness information. Additionally, or alternately, a parameter related to $R_{pipe}$ can be determined during a calibration and stored for subsequent use. Accordingly, using a suitable heat flux calculation, such as that described above, circuitry within housing 210 is able to calculate an estimate for the process fluid temperature ($T_{corrected}$) and convey an indication regarding such process fluid temperature to suitable devices and/or a control room.

Figure 3:
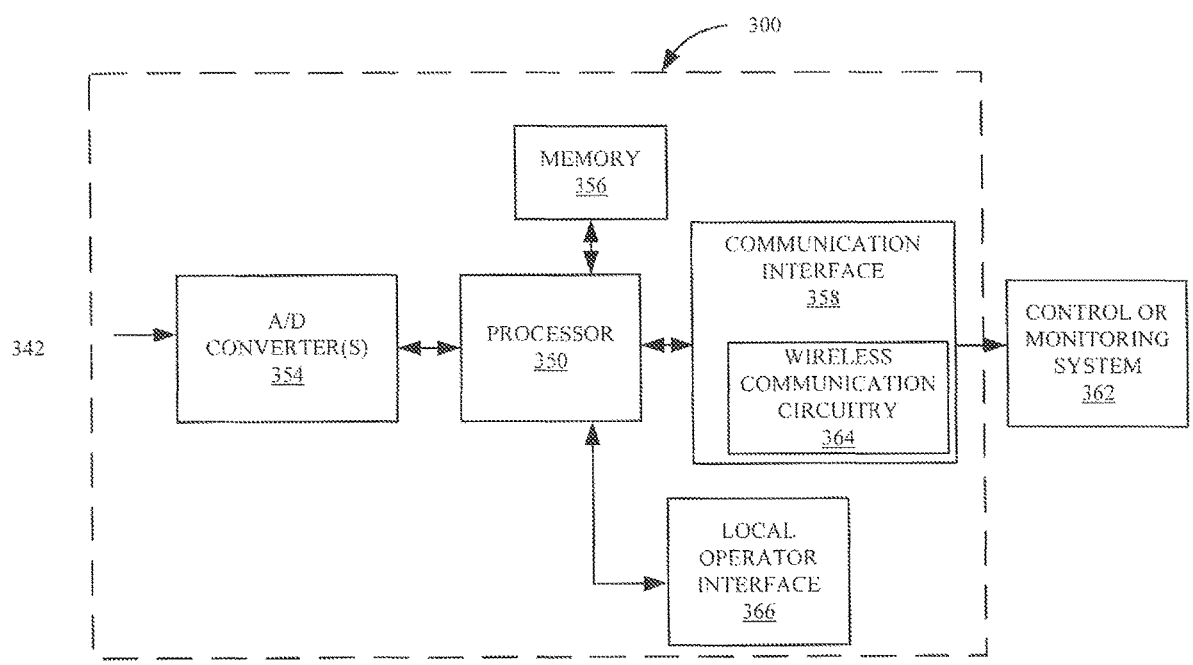
FIG. 3 is a block diagram of device electronics of a process fluid temperature measurement assembly.

FIG. 3 is a block diagram of device electronics in accordance with an embodiment of the present invention. Electronics 300 may be housed within electronics housing 210. Electronics housing 210 may be associated with a transmitter, for example transmitter 222 (shown in FIG. 2). Additionally, at least some of electronics 300 can form part of a sensor assembly, such as the sensors described herein. Electronics 300, in one embodiment, include a processor 350, one or more analog-to-digital (AD) converters 354, and memory 356. Processor 350 can be a digital microprocessor. Memory 356 can include a digital data storage device electronically coupled to processor 350. Electronics 300 may be locally accessible through a local operator interface 366 that may, for example, display a temperature or device status.

Processor 350 is connected to temperature sensors, for example the sensors discussed herein, by a coupling between an A/D converter 354 and one more sensor leads 342

In one embodiment, electronics 300 can also include communications interface 358. Communications interface 358 provides communication between electronics 300 and control or monitoring system 362. Electronics 300 may transmit a calculated temperature of a process fluid within a process to a control system 362. Communication between temperature measurement assembly 300 and control system 362 can be through any suitable wireless or hard-wired connection. For example, communication may be represented by an analog current over a two wire loop that ranges from 4-20 mA. Alternatively, the communication may be transmitted in a digital form over a two wire loop using the HART® digital protocol, or over a communication bus using a digital protocol such as FOUNDATION™ Fieldbus.

Communication interface 358 may optionally include wireless communication circuitry 364 for communication by wireless transmission using a wireless protocol such as WirelessHART (IEC62591). Moreover, communication with controller monitoring system 362 can be direct or through a network of any number of intermediate devices, for example a wireless mesh network (not shown in FIG. 3). Communication interface 358 can help manage and control communication to and from temperature measurement assembly 300. For example, control or measuring system 362 may provide for configuration of temperature measurement assembly 300, including entering or selecting base structure parameters, process vessel wall parameters, or selecting a heat transfer model for a particular application, by way of communication interface 358.

In accordance with embodiments described herein, a simplified heat flux temperature probe is provided along with a method of manufacturing the probe, which generally improves manufacturability as well as reduces manufacturing costs and leverages existing manufacturing processes. Some embodiments described herein leverage commercially-available MI (mineral-insulated) cable, also known as MIMS (mineral insulated metal sheath) cable. MI cable is generally provided with a metallic sheath of generally cylindrical shape with a number of conductors running therethrough. The conductors are insulated from one another and from the metallic sheath by an inorganic powder, such as Magnesium Oxide (MgO) or ceramic. MI cables can be specified with various different materials for the metallic sheath, as well as the conductors running therein. Further, the conductors can be specified as thermocouple metals. Examples of thermocouple metals include metals for type J thermocouples (i.e. Iron-Constantan), type K thermocouples, type N thermocouples, type E thermocouples and type T thermocouples (i.e. Copper-Constantan). Further, the metal sheath may also be specified as 304 stainless steel, 310 stainless steel, 316 stainless steel, 321 stainless steel, and Inconel, for example. One commercial supplier of MI cable is Omega Engineering of Norwalk, Connecticut.

Figure 4A:
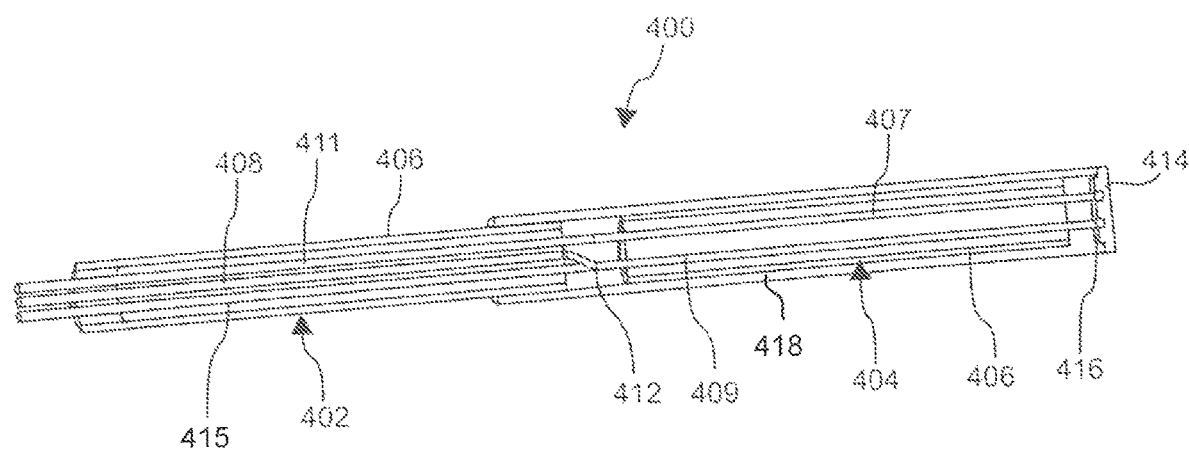
FIGS. 4A and 4B are diagrammatic cross sectional views of a heat flux sensor for a non-invasive process fluid temperature measurement system in accordance with an embodiment of the present invention.
Figure 4B:
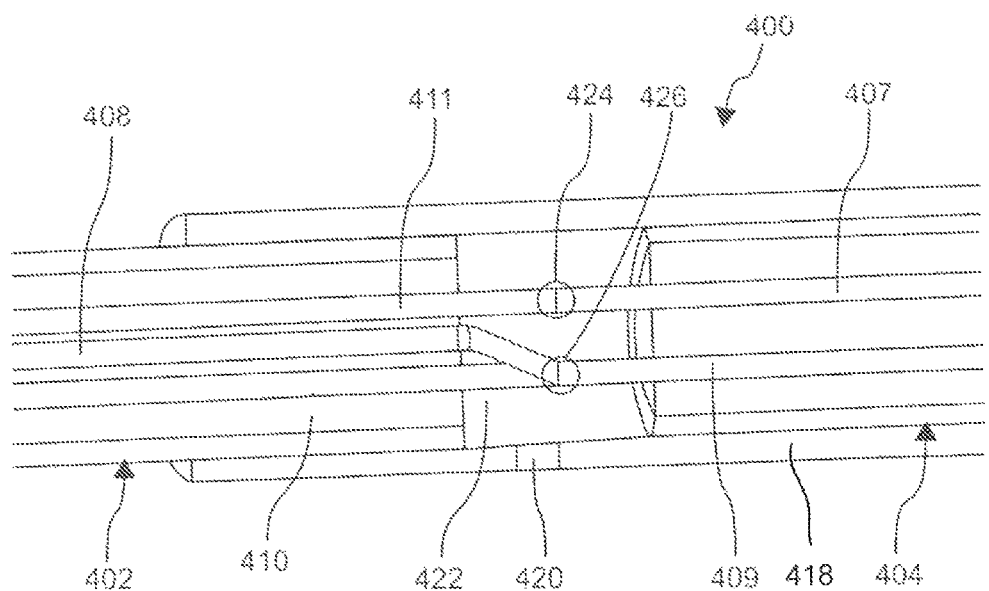

FIGS. 4A and 4B are diagrammatic cross sectional views of a heat flux sensor for a non-invasive process fluid temperature measurement system in accordance with an embodiment of the present invention. Heat flux sensor 400 is generally formed of a plurality of portions of MI cable 402, 404. As such, each MI cable portion has a metal sheath 406 containing a plurality of thermocouple conductors 408 insulated from one another and from metallic sheath 406 by inorganic powder 410. As described above, inorganic powder 410 is generally Magnesium Oxide or ceramic. First MI cable portion 402 is illustrated having three thermocouple conductors 408, 411, and 415. Of the three, conductors 408 and 415 are joined together at cold end thermocouple junction 412 located between first MI cable portion 402 and second MI cable portion 404. Additionally, second MI cable portion 404 has a plurality of thermocouple conductors 407, 409 that terminate at sensor end cap 414 forming hot end thermocouple junction 416.

As can be seen in FIGS. 4A and 4B, some of the conductors of the first MI cable portion are electrically coupled, such as by welding, to conductors of the second MI cable portion. In the illustrated example, conductor 411 of MI cable portion 402 is welded to conductor 407 of second MI cable portion 404 at location 424. Similarly, conductors 408 and 415 of MI cable portion 402 are welded to conductor 409 of MI cable portion 404 at location 426. When thermocouple conductor wires in one MI cable portion are welded to thermocouple conductor wires in another cable in order to simply couple the two conductors together (i.e., not create a thermocouple) the two conductors must be the same metal as one another.

FIGS. 4A and 4B also show support tube 418 is provided over the entire length of second MI cable portion 404 as well as a portion of first MI cable 402. Support tube 418 is fixed to metal sheath 406 of first MI cable 402 by a suitable process, such as welding.

The design shown in FIGS. 4A and 4B can use commercially-available off-the-shelf MI cable and MgO powder and will allow for high accuracy in junction location (i.e., the position of cold junction thermocouple 412 relative to hot end junction thermocouple 416). Preferably, first MI cable portion 402 and second MI cable portion 404 are welded to exterior support tube 418 after the thermocouple junctions are created. This support tube 418 includes a hole 420 (shown in FIG. 4B) which allows chamber 422 between first MI cable portion 402 and second MI cable portion 404 to be filled with a suitable insulator, such as MgO or ceramic, after the thermocouple junctions are created. Once cavity 422 is filled, hole 420 can be sealed by creating a weld to fill hole 420. Air may be sufficient as an electrical insulator instead of insulative material 410 depending on conductor spacing from metal sidewall. Hole 420 may not be necessary in this case. As can be appreciated, by specifying various numbers of conductors in the MI cable portion, various wiring combinations can be employed in accordance with embodiments described herein.

Figure 5A:
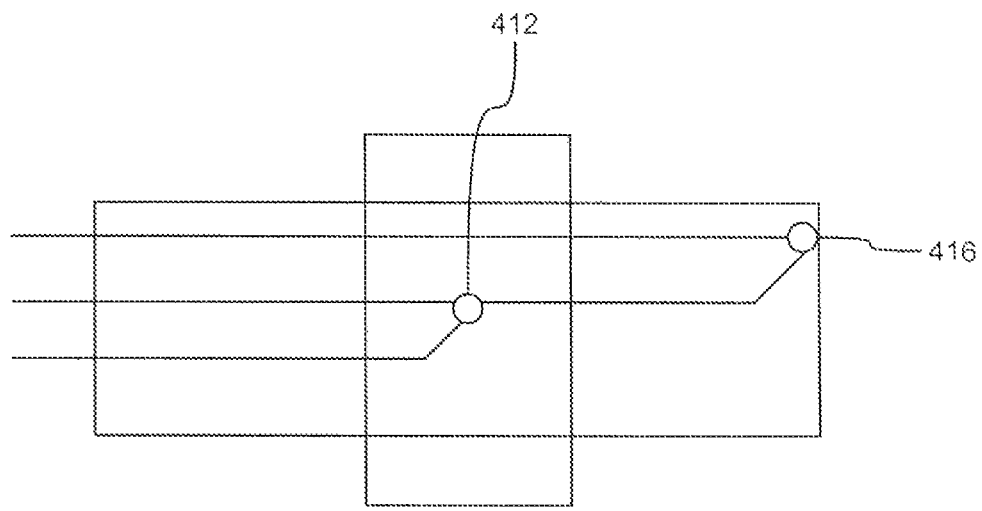
FIGS. 5A-5D are variations of thermocouple configurations in accordance with embodiments of the present invention.
Figure 5B:
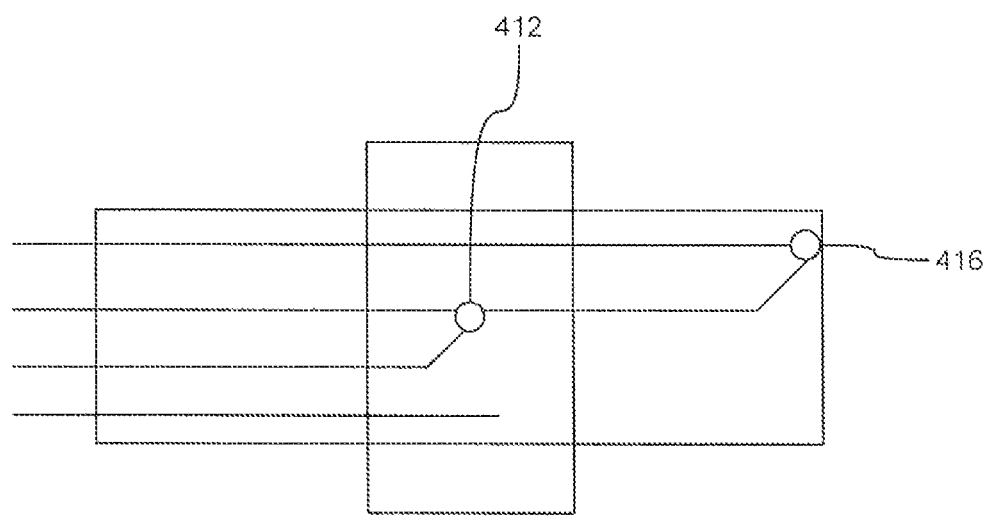
Figure 5C:
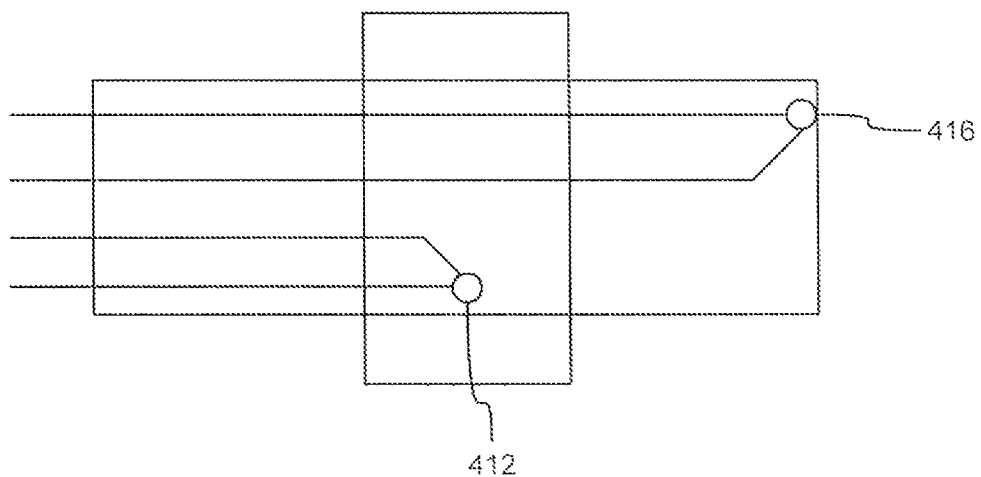

FIGS. 5A-5D are variations of thermocouple configurations in accordance with embodiments of the present invention. FIG. 5A illustrates a three-wire MI cable joined to a two-wire MI cable. FIG. 5B illustrates a four-wire MI cable joined to a two-wire MI cable. As can be seen, junctions 412 and 416 share one conductor and one wire is left unused. FIG. 5C illustrates a first MI cable being a four-wire cable being joined to a two-wire MI cable. Note, junctions 412, 416 do not share a conductor.

Figure 5D:
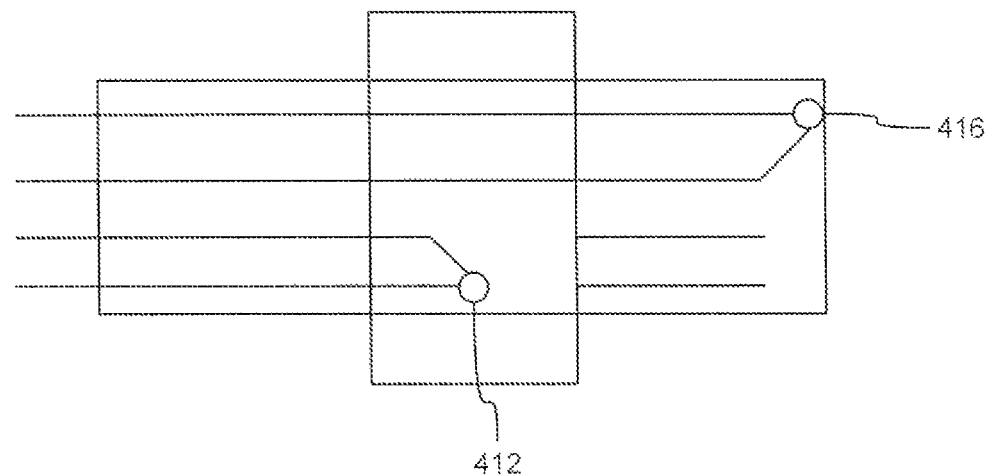

In FIG. 5D, a single four-wire MI cable is used, and material is simply removed at the second junction. Two conductors after the second junction are then unused. A similar configuration could also be done using a single three-wire MI cable with one shared conductor. In either such embodiment, the outer sheath 406 of the MI cable or a portion thereof is removed at the location of the second junction. Two wires of the four-wire MI cable would be cut and welded together at this location thereby forming cold end thermocouple junction 412. The junction is then covered with a suitable sleeve, such as sleeve 502 (shown in FIG. 6A) and the sleeve is welded or otherwise connected to the MI cable. An aperture in the sleeve can be used to fill and then seal the junction, as desired. This particular embodiment may allow for higher precision positioning of the second junction thermocouple relative to the hot end thermocouple junction. As set forth above, the positioning of the second end thermocouple junction becomes of greater importance when an algorithm or processing technique is employed that relies upon the thermal impedance between these two positions. This thermal impedance is based upon the material through which heat flows (e.g., generally MI cable) as well as the length through which the heat must flow.

Figure 6A:
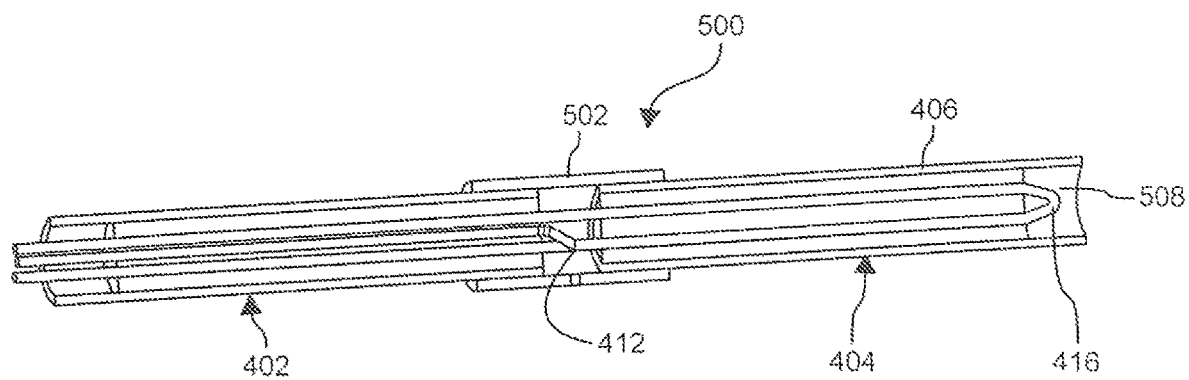
FIGS. 6A and 6B are diagrammatic cross sectional views of a heat flux sensor for a non-invasive process fluid temperature measurement system in accordance with another embodiment of the present invention.
Figure 6B:
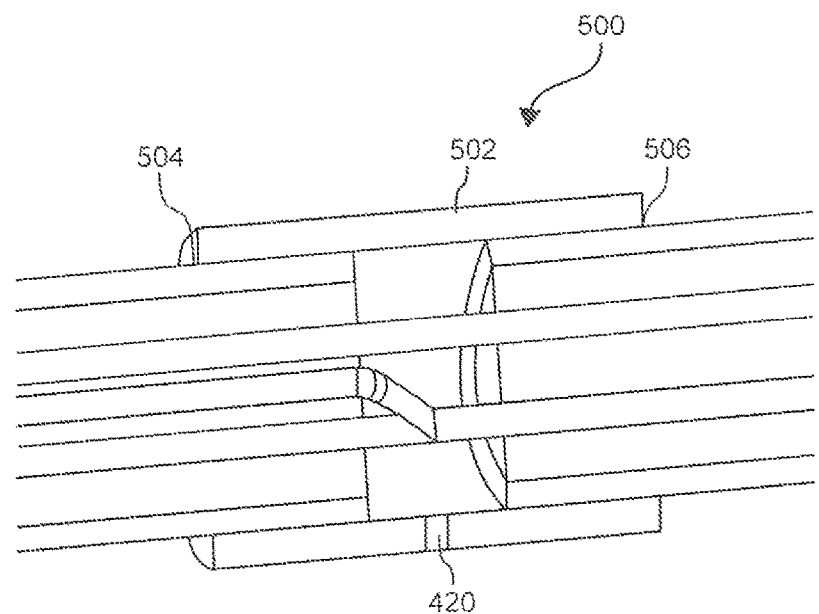

FIGS. 6A and 6B are diagrammatic cross sectional views of a heat flux sensor for a non-invasive process fluid temperature measurement system in accordance with another embodiment of the present invention. Heat flux sensor 500 bears some similarities to heat flux sensor 400, and like components are numbered similarly. One difference between sensor 400, and sensor 500, is that support tube 502 does not run the full length of one of MI cable portions 402 and 404. Instead, support tube 502 simply extends over a portion of each of MI cables 402 and 404 proximate cold thermocouple junction 412. As shown in FIG. 6B, support tube 502 does include a fill aperture 420 through which an insulative material is provided. While the insulative material may be inorganic powder in this embodiment, such as MgO or ceramic, it is also expressly contemplated that a potting material such as epoxy could be introduced through aperture 420 in order to generate an environmental seal.

In the embodiments shown in FIGS. 6A and 6B, support tube 502 is attached to each of first MI cable portion 402 and second MI cable portion 404 at respective interfaces 504, 506. Welds can be provided at each of these attachment interfaces. However, it is also expressly contemplated that support tube 502 could be crimped to first MI portion 402 instead of welding interface 504. This is particularly so when a potting material is used to generate the environmental seal.

Another difference between sensor 500 and sensor 400, is that sensor 500 does not require an end cap coupled to hot end thermocouple 416. Instead, hot end thermocouple 416 is grounded to sheath 406 of second MI cable 404 at position 508. However, in an alternate embodiment, hot end thermocouple 416 could be grounded to an endcap that is welded or otherwise mounted to the end of second MI cable 404.

As can be appreciated, while embodiments described thus far generally provide a pair of thermocouples spaced apart by a precise distance using commercially-available MI cable, it is also expressly contemplated that more than two thermocouples can be provided spaced apart by simply adding additional portions of MI cable and coupling in accordance with the various techniques described herein. Thus, a sensor with three or more thermocouples spaced apart along MI cable where in each is electrically coupled to measurement circuitry of a temperature measurement system that employs a heat flux calculation is expressly contemplated.

Figure 7:
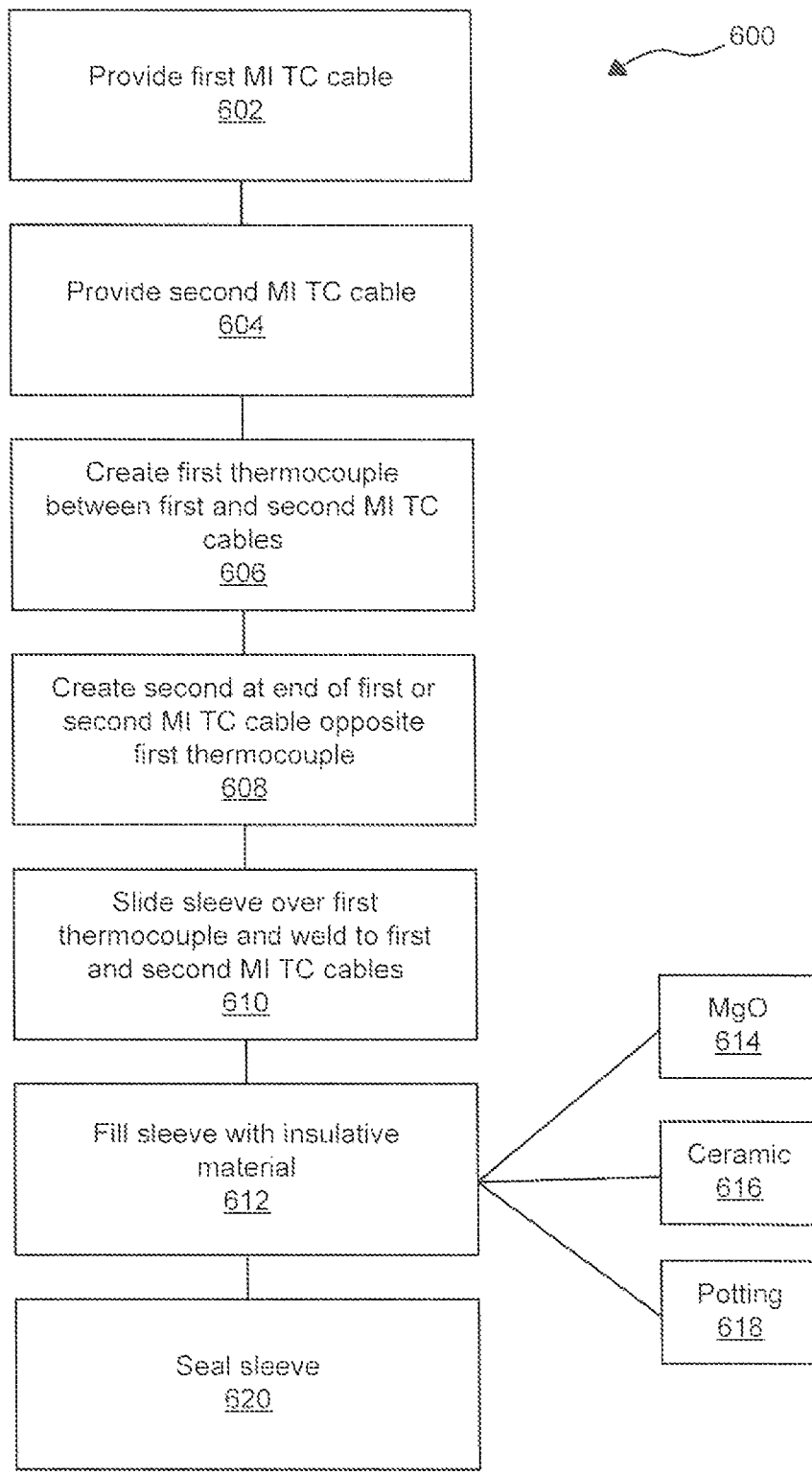
FIG. 7 is a flow diagram of a method of manufacturing a heat flux sensor in accordance with an embodiment of the present invention.

FIG. 7 is a flow diagram of method of manufacturing a heat flux sensor in accordance with an embodiment of the present invention. Method 600 begins at block 602 where a first MI thermocouple cable portion is provided. One example such a cable is illustrated in FIG. 4 at reference numeral 402. Next, at block 604, a second MI thermocouple cable is provided. An example of the second MI thermocouple cable is shown in FIG. 4A at reference numeral 404. Next, at block 606, a first thermocouple is created between the first and second MI thermocouple cables. This first thermocouple is considered a cold end thermocouple junction. Next, at block 608 a second thermocouple is formed at an end of one of the first and second MI thermocouple cables opposite the first thermocouple. An example of this second thermocouple is shown in FIG. 4A at reference numeral 416. As can be seen, thermocouple 416 is at an opposite end of second MI cable 404 relative to cold end thermocouple 412.

Next, at block 610, a sleeve is slid over the first thermocouple and coupled to the first and second MI thermocouple cables, such as by welding or crimping. This sleeve can be support sleeve 418 (shown in FIG. 4A) or support sleeve 502 (shown in FIG. 6A). Next, at block 612, the sleeve is filled with an insulative material. Step 612 may be optional depending on conductor spacing to sidewall. This insulative material may be MgO powder 614, ceramic powder 616, or potting material 618. Next, at block 620, the sleeve is sealed. In embodiments that use MgO 614 or ceramic powder 616, the sleeve is sealed by welding the aperture through which the powder was introduced. In embodiments where the insulative material is potting 618, the seal is sleeved simply by virtue of curing of the potting material.

Although the present invention has been described with reference to preferred embodiments, workers skilled in the art will recognize that changes may be made in form and detail without departing from the spirit and scope of the invention.

What is claimed is:
1. A heat flux temperature sensor probe comprising:
   a first mineral-insulated cable portion having a first metallic sheath, a first plurality of thermocouple conductors extending therein, and an inorganic insulative material

Insulating the first plurality of thermocouple conductors from one another and from the first metallic sheath;
a second mineral-insulated cable portion having a second metallic sheath, a second plurality of thermocouple conductors extending therein, and an inorganic insulative material insulating the second plurality of thermocouple conductors from one another and from the second metallic sheath;
a first thermocouple formed between at least one of the first plurality of thermocouple conductors and one of the second plurality of thermocouple conductors proximate a first end of the second mineral-insulated cable portion;
a second thermocouple formed between at least two of the second plurality of thermocouple conductors proximate a second end of the second mineral-insulated cable portion; and
a sheath operably coupled to and connecting the first and second mineral insulated cable portions, a portion of an interior of the sheath being filled with a non-conductive material, wherein the second thermocouple is electrically coupled to the second metallic sheath proximate the second end of the second mineral-insulated cable portion.

2. The heat flux temperature probe of claim 1, and further comprising at least one coupling of an identical type thermocouple conductor wire-between the first plurality of thermocouple conductors to the second plurality of thermocouple conductors.

3. The heat flux temperature probe of claim 1, wherein the inorganic insulative material is magnesium oxide powder.

4. The heat flux temperature probe of claim 1, wherein the inorganic insulative material is ceramic.

5. The heat flux temperature probe of claim 1, wherein the number of the first plurality of thermocouple conductors is greater than the number of the second plurality of thermocouple conductors.

6. The heat flux temperature probe of claim 1, wherein the inorganic insulative material is air.

7. The heat flux temperature probe of claim 1, wherein the sheath is formed of metal.

8. The heat flux temperature probe of claim 7, wherein the sheath is welded to at least one of the first and second mineral-insulated cable portions.

9. The heat flux temperature probe of claim 1, wherein the sheath seals the non-conductive material therein.

10. The heat flux temperature probe of claim 9, wherein the sheath includes an aperture, through which the non-conductive material is provided, and after which is sealed.

11. The heat flux temperature probe of claim 10, wherein the aperture is welded.

12. A heat flux temperature sensor probe comprising:
a first mineral-insulated cable portion having a first metallic sheath, a first plurality of thermocouple conductors extending therein, and an inorganic insulative material insulating the first plurality of thermocouple conductors from one another and from the first metallic sheath;
a second mineral-insulated cable portion having a second metallic sheath, a second plurality of thermocouple conductors extending therein, and an inorganic insulative material insulating the second plurality of thermocouple conductors from one another and from the second metallic sheath;
a first thermocouple formed between at least one of the first plurality of thermocouple conductors and one of the second plurality of thermocouple conductors proximate a first end of the second mineral-insulated cable portion;
a second thermocouple formed between at least two of the second plurality of thermocouple conductors proximate a second end of the second mineral-insulated cable portion; and
a sheath operably coupled to and connecting the first and second mineral insulated cable portions, a portion of an interior of the sheath being filled with a non-conductive material, wherein the sheath extends over an entire length of the second mineral-insulated cable portion.

13. A heat flux temperature sensor probe comprising:
a first mineral-insulated cable portion having a first metallic sheath, a first plurality of thermocouple conductors extending therein, and an inorganic insulative material insulating the first plurality of thermocouple conductors from one another and from the first metallic sheath;
a second mineral-insulated cable portion having a second metallic sheath, a second plurality of thermocouple conductors extending therein, and an inorganic insulative material insulating the second plurality of thermocouple conductors from one another and from the second metallic sheath;
a first thermocouple formed between at least one of the first plurality of thermocouple conductors and one of the second plurality of thermocouple conductors proximate a first end of the second mineral-insulated cable portion;
a second thermocouple formed between at least two of the second plurality of thermocouple conductors proximate a second end of the second mineral-insulated cable portion;
a sheath operably coupled to and connecting the first and second mineral insulated cable portions, a portion of an interior of the sheath being filled with a non-conductive material; and
an endcap attached to the sheath proximate the second end of the second metallic sheath.

14. A heat flux temperature sensor probe comprising:
a first mineral-insulated cable portion having a first metallic sheath, a first plurality of thermocouple conductors extending therein, and an inorganic insulative material insulating the first plurality of thermocouple conductors from one another and from the first metallic sheath;
a second mineral-insulated cable portion having a second metallic sheath, a second plurality of thermocouple conductors extending therein, and an inorganic insulative material insulating the second plurality of thermocouple conductors from one another and from the second metallic sheath;
a first thermocouple formed between at least one of the first plurality of thermocouple conductors and one of the second plurality of thermocouple conductors proximate a first end of the second mineral-insulated cable portion;
a second thermocouple formed between at least two of the second plurality of thermocouple conductors proximate a second end of the second mineral-insulated cable portion;
a sheath operably coupled to and connecting the first and second mineral insulated cable portions, a portion of an interior of the sheath being filled with a non-conductive material; and wherein the number of the first plurality of thermocouple conductors is greater than the number of the second plurality of thermocouple conductors.

\* \* \* \* \*